United States Patent
Habara et al.

(10) Patent No.: US 6,769,610 B2
(45) Date of Patent: Aug. 3, 2004

(54) CREDIT CARD DOUBLE AUTHENTICATION SYSTEM

(75) Inventors: Takaaki Habara, Yokohama (JP);
Norikazu Yamagishi, Yokohama (JP);
Toshihito Ochi, Yokohama (JP);
Mutsuharu Takesada, Yokohama (JP);
Noriaki Shiomi, Yokohama (JP);
Hikaru Numoto, Yokohama (JP);
Yoshitaka Kawamura, Yokohama (JP)

(73) Assignee: Hitachi Electronic Service Co., Ltd., Yokohama (JP)

( * ) Notice: Subject to any disclaimer, the term of this patent is extended or adjusted under 35 U.S.C. 154(b) by 0 days.

(21) Appl. No.: 10/234,759

(22) Filed: Sep. 5, 2002

(65) Prior Publication Data

US 2003/0052163 A1 Mar. 20, 2003

(30) Foreign Application Priority Data

Sep. 19, 2001 (JP) ........................................ 2001-284297

(51) Int. Cl.[7] ................................................ G06K 5/00
(52) U.S. Cl. ...................................... 235/380; 235/382
(58) Field of Search ............................ 235/380, 375, 235/379, 381, 382, 383, 385

(56) References Cited

U.S. PATENT DOCUMENTS

| 4,692,747 | A | * | 9/1987 | Wolf ........................... 340/572 |
| 5,473,144 | A | * | 12/1995 | Mathurin, Jr. .............. 235/380 |
| 5,587,703 | A | * | 12/1996 | Dummont ................... 340/572 |
| 5,598,474 | A | * | 1/1997 | Johnson ...................... 713/186 |
| 5,992,570 | A | * | 11/1999 | Walker et al. ................ 186/36 |
| 6,270,011 | B1 | * | 8/2001 | Gottfried .................... 235/379 |
| 6,516,997 | B1 | * | 2/2003 | Tamazawa et al. ......... 235/380 |
| 6,561,417 | B1 | * | 5/2003 | Gadd ......................... 235/383 |

* cited by examiner

Primary Examiner—Daniel St. Cyr
(74) Attorney, Agent, or Firm—Fildes & Outland, P.C.

(57) ABSTRACT

A credit card double authentication system 1 comprises an item checkout gate 2, an ID authentication check/item checkout unit 3, a personal computer 20 of an in-store card management section 4, an item ID assignment unit 5, a card management center 6 and a credit card company 7 which are connected via a communication line 8 so as to send and receive item information. An individual authenticating unit 11 having an identity authenticating function performs identity authentication based on a card ID 9 of a credit card CC being used by a user P when purchasing an item and based on a personal ID 10 of the user P, thereby preventing unauthorized use of the credit card.

11 Claims, 9 Drawing Sheets

CREDIT CARD DOUBLE AUTHENTICATION SYSTEM

FIELD OF THE INVENTION

The present invention relates to a credit card double authentication system for authenticating the use of a credit card twice, thereby preventing unauthorized use of the credit card.

DESCRIPTION OF THE RELATED ART

Heretofore, various credit cards are issued that can be used at stores such as supermarkets and department stores. When a user wishes to purchase an item at a store using a credit card, the user presents the credit card at the register of the store at first, and then the personal number stored in the credit card and the price of the item are input at the register of the store. Since the only means for confirming at the store whether the credit card user is actually the authenticated card owner is the signature of the user, according to the conventional system, the credit card can be used by an unauthorized stranger. According further to the conventional system, the checkout of the item at the register of the store was time-consuming, and much manpower had to be placed at the register, increasing personnel costs required to operate the register. The high costs pushed up the costs of the items sold at the store, depriving the users of their rights to purchase items at moderate prices. Even further, if the user lost his/her credit card, he/she had to follow bothersome procedures, so the user was required to handle the credit card with much care.

SUMMARY OF THE INVENTION

The object of the present invention is to provide a credit card double authentication system that solves the above-mentioned problems of the prior art by providing a service that alternately carries out the management business of a personal ID of the credit card user and the card ID of the credit card, and thereby enables to perform management of the personal ID of the user and the card ID of the credit card at low cost. The present system comprises an individual authentication unit that performs at the time of purchase of an item by a user authentication of the card user utilizing a personal ID of the user in addition to the authentication of a card user using the card ID of the credit card. Thus, the present system authenticates the credit card twice, securely preventing unauthorized use of the credit card. According further to the present system, the items can be checked out quicker at the item checkout gate, and the item checkout gate can be unmanned, enabling efficient cut-down of personnel costs that lead to reduced prices of items. According to the present system, the credit card user is not required to follow bothersome procedures even when he/she lost his/her credit card, so the user can use the credit card without feeling anxious.

The credit card double authentication system according to the present invention comprises an item checkout gate, an ID authentication check/item checkout unit, a personal computer in an in-store card management section, an item ID assignment unit, a card management center and a credit card company, which are connected via a communication line so as to send and receive item information, characterized in comprising an individual authenticating unit having an identity authenticating function for performing identity authentication based on a card ID of a credit card used by a user upon purchasing a product and further performing identity authentication based on a personal ID of the user.

According to the present credit card double authentication system, it further comprises a function to record a card ID of a credit card that a user uses and a personal ID of the user to the customer database in the in-store card management section and in the card management center when a user uses a store.

According to the present credit card double authentication system, the item ID assignment unit comprises a function to assign an item ID to an item, and the store further comprises a function to register the item information and the item ID of the item to a database of the item ID assignment unit.

According to the present credit card double authentication system, the item checkout gate is equipped with a function to read in the card ID of the credit card used by the user, the personal ID of the user and the item ID assigned to the item at the time of purchase of the item, and to send the information to the ID authentication check/item checkout unit.

According further to the present credit card double authentication system, the ID authentication check/item checkout unit is equipped with a function to authenticate the use of the credit card upon receiving the card ID of the credit card and the personal ID of the user.

According to the present credit card double authentication system, the ID authentication check/item checkout unit is equipped with a function to read in the item information corresponding to the received item ID from a database and checking out the item after authenticating the use of the credit card.

According further to the present credit card double authentication system, the item checkout gate is equipped with a gate that can be opened and closed, and is further equipped with a function to close the gate and sound out an alarm when according to the authentication process it is determined that the credit card is not used by its owner.

According yet to the present credit card double authentication system, the item checkout gate is equipped with a function to issue a receipt when a receipt issue request from a user exists, and a function to issue a till receipt when there is no receipt issue request from the user.

According further to the present credit card double authentication system, the in-store card management section, the card management center and the credit card company makes an agreement to mutually send and receive a blacklist data intended to prevent unauthorized use of credit card, the card management center receiving the blacklist data through the communication line from the credit card company, and the card management center sending the blacklist data through the communication line to the in-store card management section and if necessary to the ID authentication check/item checkout unit.

According further to the present credit card double authentication system, the item checkout gate is equipped with a function to check the card ID of the credit card read at the gate with the blacklist data at the ID authentication check/item checkout unit at the time of purchase of an item by a user.

According to the present credit card double authentication system, the item checkout gate is further equipped with a function to output a notice reporting unauthorized credit card use if the card ID of the credit card read at the item checkout gate matches the blacklist data stored at the ID authentication check/item checkout unit or at the in-store card management section.

According to the present credit card double authentication system, the item checkout gate is equipped with a function to read in the card ID of the credit card and the personal ID of the user at the time of purchase of an item by the user, to send the card ID of the credit card through the communication line to the credit card company, and to receive the authentication result of the card ID of the credit card.

DETAILED DESCRIPTION OF THE PREFERRED EMBODIMENT

We will now explain in detail the preferred embodiment of the present invention with reference to the accompanied drawings.

Figure 1:
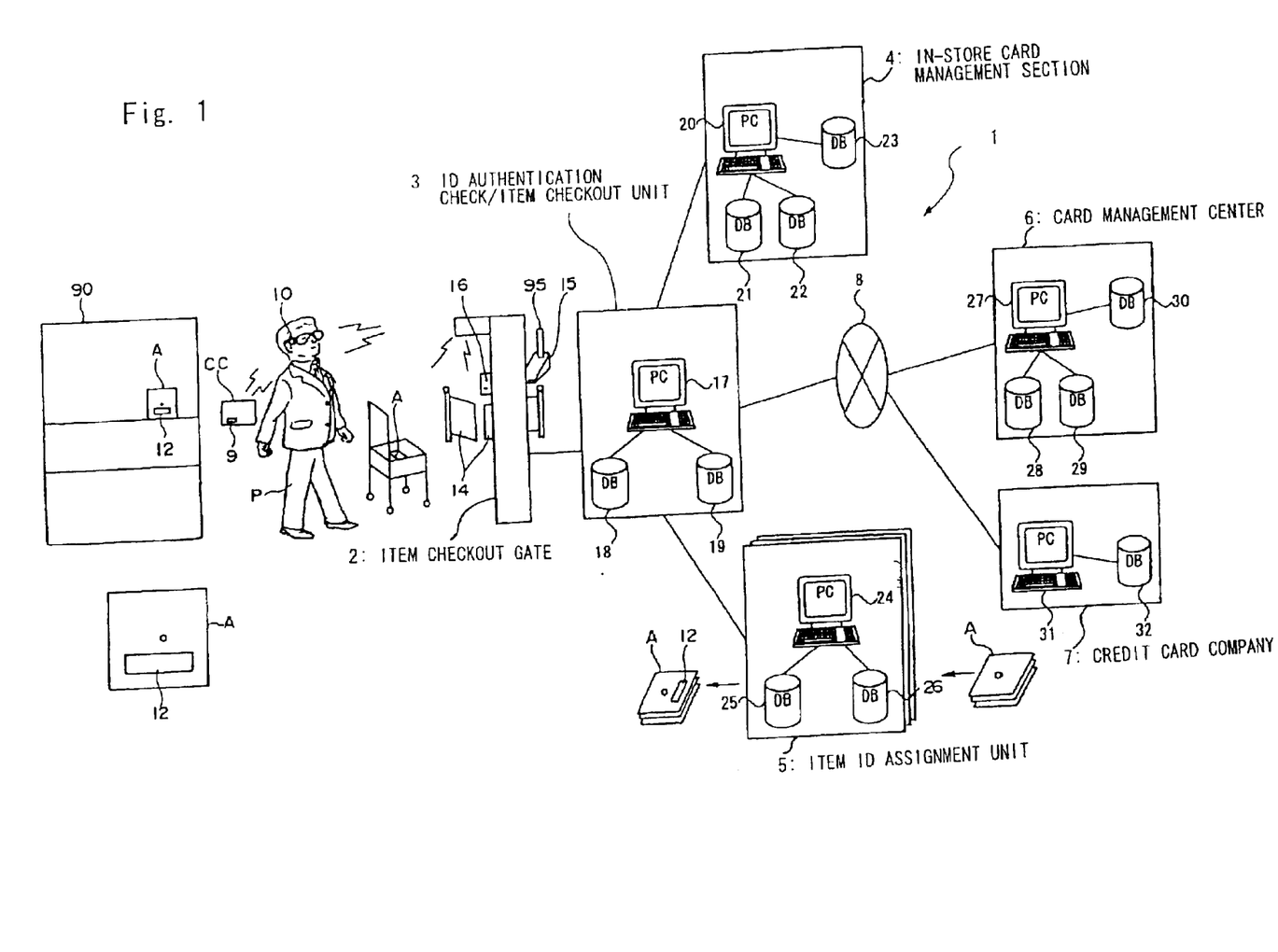
FIG. 1 shows the configuration of the credit card double authentication system according to a preferred embodiment of the present invention.

FIG. 1 is a drawing showing the configuration of the credit card double authentication system according to the embodiment of the present invention.

As shown in FIG. 1, the credit card double authentication system of the present invention comprises an item checkout gate 2, an ID authentication check/item checkout unit 3, a personal computer 20 disposed at an in-store card management section 4, an item ID assignment unit 5, a card management center 6, a credit card company 7, a communication line 8 that connects the above-mentioned units enabling them to send and receive item information, and an individual authentication unit 11 having an individual identity authenticating function to perform individual authentication utilizing an individual ID 10 of a user P in addition to individual authentication utilizing a card ID 9 of a credit card CC that the user P uses at the time of purchase of the items.

The credit card double authentication system 1 according to the present invention further comprises an item authenticating unit 13 for authenticating an item using an item ID 12 uniquely assigned to an item A.

As shown in FIG. 1, the item checkout gate 2 of system 1 comprises a gate 14 that can be controlled to open and close, a receipt issue unit 15 for issuing receipt, and a receipt issue button 16 for operating the receipt issue unit 15.

The item checkout gate 2 of the authentication system 1 is designed to read in the card ID 9 of the credit card CC used by the user P and the item ID 12 assigned to item A.

As shown in FIG. 1, the ID authentication check/item checkout unit 3 of the authentication system 1 comprises a personal computer (PC) 17, a database (DB) 18 for storing the item ID 12 of item A, and a blacklist database (DB) 19 registering the blacklist data.

The ID authentication check/item checkout unit 3 of the authentication system 1 checks the card ID 9 of the credit card CC, the personal ID 10 of the user P and the item ID 12 of the item A, and performs checkout of the purchased item A.

As shown in FIG. 1, the in-house card management section 4 of the authentication system 1 comprises a personal computer (PC) 20, a card ID database (DB) 21 recording the card ID 9 of the credit card CC, an individual ID database (DB) 22 recording the personal ID 10 of the user P, and a blacklist database (DB) 23 recording the blacklist data.

The in-house card management section 4 of the present authentication system 1 performs update of the registered data of card ID 9 of the credit card CC, the personal ID 10 of the user P, and the item ID 12 of the item A.

As shown in FIG. 1, the item ID assignment unit 5 of the present system comprises a personal computer (PC) 24, an item information database (DB) 25 recording item information, and an item ID database (DB) 26 recording the item ID 12 of item A.

The item ID assignment unit 5 assigns an item ID 12 to item A.

The card management center 6 of the present authentication system 1 comprises, as shown in FIG. 1, a personal computer (PC) 27, a personal ID database (DB) 28 for recording the personal ID 10 of user P, a credit card company management database (DB) 29 for recording the credit card company management data corresponding to each credit card company 7, and a blacklist database (DB) 30 for recording the blacklist data.

The credit card company 7 of the present authentication system 1 comprises, as shown in FIG. 1, a personal computer (PC) 31, and a blacklist database (DB) 32 for recording the blacklist data.

In FIG. 1, reference number 90 indicates a shelf located within a store for displaying item A having assigned thereto an item ID 12.

The functions of the credit card double authentication system 1 according to the present invention includes registering the card ID 9 of the credit card used by user P and the personal ID 10 of user P to the card ID database 21 which is the customer database located at the in-store card management section 4 and to the personal ID database 28 of the card management center 6, when the user P shops at the store.

The functions of the authentication system 1 further include assigning an item ID 12 to item A through the item ID assignment unit 5, and recording at the store the item information and the item ID 12 of item A to the item information database 25 and item ID database 26 of item ID assignment unit 5.

The functions of the authentication system 1 further include reading the card ID 9 of the credit card used by user P, the personal ID 10 of user P and the item ID 12 assigned to item A at the time of purchase at the item checkout gate 2, and transmitting the data to the ID authentication check/item checkout unit 3.

The functions of the authentication system 1 further include authenticating credit card use upon receiving the card ID 9 of the credit card and the personal ID 10 of the user P at the ID authentication check/item checkout unit 3.

The functions of the authentication system 1 further include taking out from the database 18 the item information corresponding to the received item ID 12 and checking out the item at the ID authentication check/item checkout unit 3 after authenticating credit card use.

The functions of the authentication system 1 further include closing gate 14 provided at the item checkout gate 2 and sounding an alarm after recognizing unauthorized use of credit card.

The functions of the authentication system 1 include issuing a receipt when user P requests issuance of receipt at the item checkout gate 2, and issuing a till receipt when no receipt issuance request is received from user P.

The functions of the authentication system 1 further include making an agreement to transmit and receive blacklist data for preventing unauthorized use of credit card between the in-store card management section 4, the card management center 6 and the credit card company 7, and receiving at the card management center 6 the blacklist data from the credit card company 7 via the communication line 8, and further transmitting the blacklist data from the card management center 6 to the in-store card management section 4 and if necessary to the ID authentication check/item checkout unit 3 via the communication line 8.

The functions of the authentication system 1 further include checking the card ID 9 of the credit card read at the item checkout gate 2 with the blacklist data stored at the ID authentication check/item checkout unit 3.

The functions of the authentication system 1 include sending out a notice notifying unauthorized use of the credit card when the credit card ID 9 read at the item checkout gate 2 is found in the blacklist data stored at the ID authentication check/item checkout unit 3 or at the in-store card management section 4.

The functions of the authentication system 1 further include reading the card ID 9 of the credit card and the personal ID 10 of the user P at the item checkout gate 2, transmitting the card ID 9 via the communication line 8 to the credit card company 7, and receiving the authentication result of the card ID 9.

Figure 2:
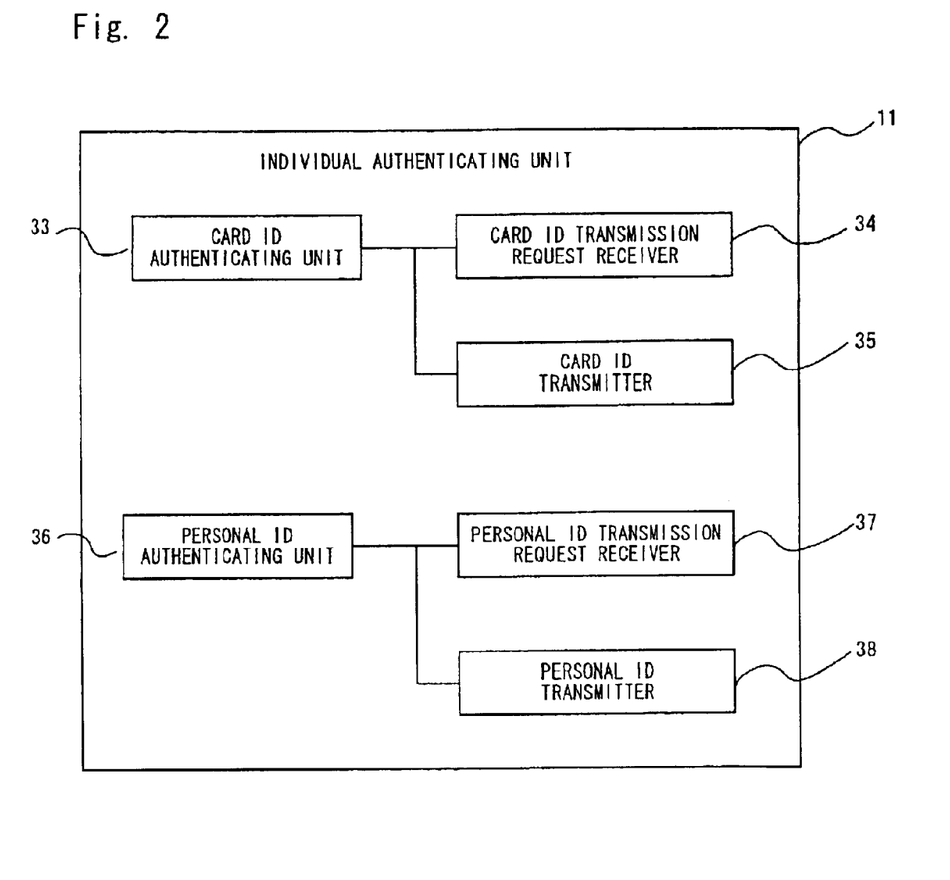
FIG. 2 shows the configuration of the individual authenticating unit according to the present credit card double authentication system.

FIG. 2 shows the configuration of the individual authentication unit of the credit card double authentication system according to the present invention.

As shown in FIG. 2, the individual authenticating unit 11 of the authentication system 1 comprises a card ID authenticating unit 33 storing the card ID 9 of the credit card, a card ID transmission request receiver 34, a card ID transmitter 35, a personal ID authenticating unit 36 for storing the personal ID 10 of user P, a personal ID transmission request receiver 37, and a personal ID transmitter 38.

As shown in FIG. 2, the card ID authenticating unit 33 is connected with a card ID transmission request receiver 34 and a card ID transmitter 35, and the personal ID authenticating unit 36 is connected with a personal ID transmission request receiver 37 and a personal ID transmitter 38.

Figure 3:
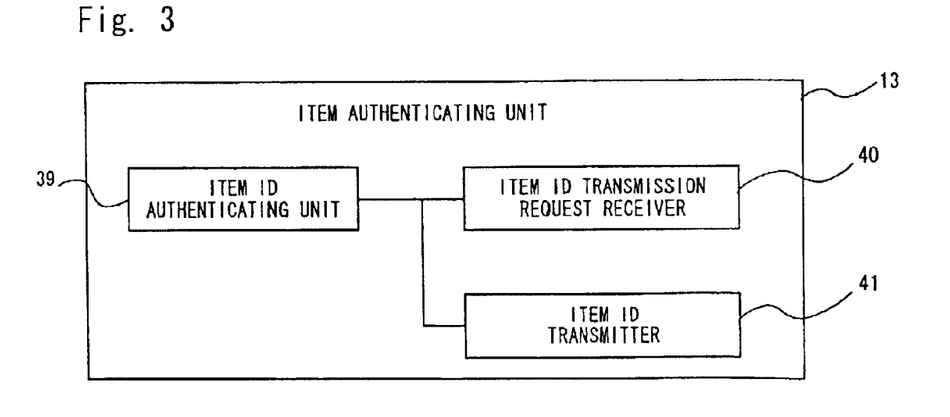
FIG. 3 shows the configuration of the item authenticating unit according to the present credit card double authentication system.

FIG. 3 is a drawing showing the configuration of an item authenticating unit of the credit card double authentication system according to the present invention.

As shown in FIG. 3, the item authenticating unit 13 of the authentication system 1 comprises an item ID authenticating unit 39 storing the item ID 12 of item A, an item ID transmission request receiver 40, and an item ID transmitter 41.

As shown in FIG. 3, the item ID authenticating unit 39 is connected with an item ID transmission request receiver 40 and an item ID transmitter 41.

Figure 4:
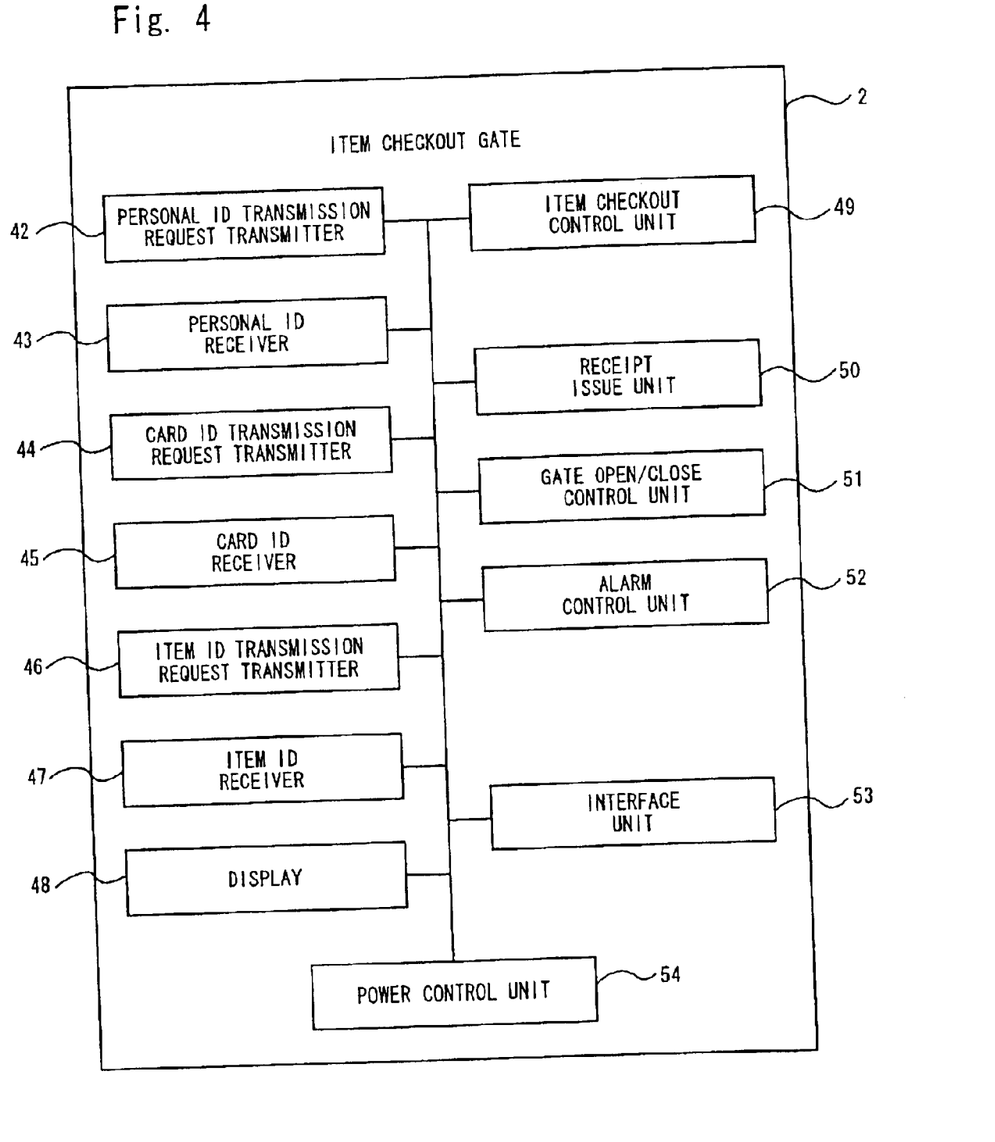
FIG. 4 shows the configuration of the item checkout gate according to the present credit card double authentication system.

FIG. 4 shows the configuration of the item checkout gate of the credit card double authentication system according to the present invention.

As shown in FIG. 4, the item checkout gate 2 of the authentication system 1 comprises a personal ID transmission request transmitter 42, a personal ID receiver 43, a card ID transmission request transmitter 44, a card ID receiver 45, an item ID transmission request transmitter 46, an item ID receiver 47, a display unit 48, an item checkout controller 49, a receipt issuance unit 50, a gate open/close control unit 51, an alarm control unit 52, an interface unit 53, and a power control unit 54.

As shown in FIG. 4, the power control unit 54 of the item checkout gate 2 is connected with the personal ID transmission request transmitter 42, the personal ID receiver 43, the card ID transmission request transmitter 44, the card ID receiver 45, the item ID transmission request transmitter 46, the item ID receiver 47, the display 48, the item checkout controller 49, the receipt issue unit 50, the gate open/close control unit 51, the alarm control unit 52, and the interface unit 53.

Figure 5:
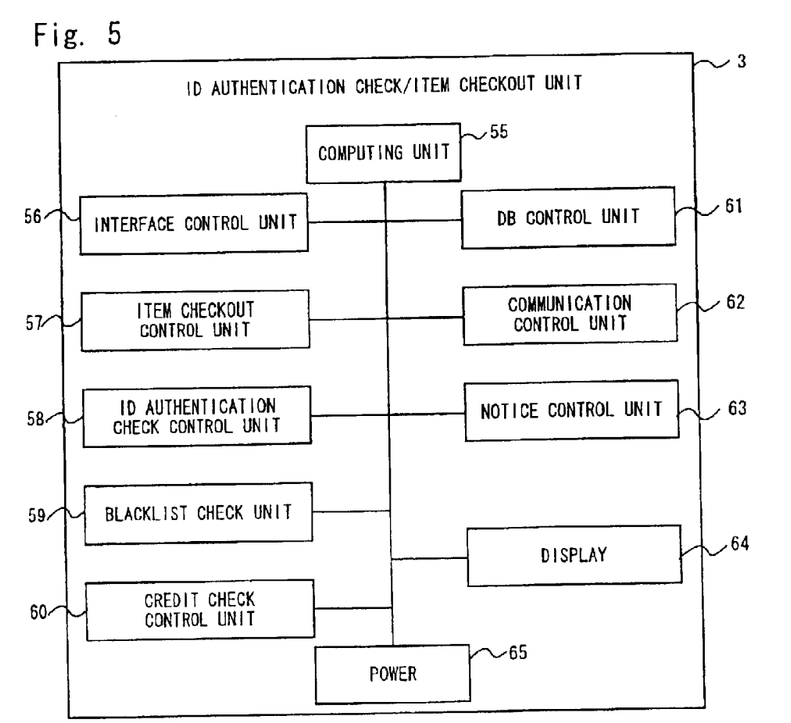
FIG. 5 shows the configuration of the ID authentication check/item checkout unit according to the present credit card double authentication system.

FIG. 5 is a drawing showing the configuration of the ID authentication check/item checkout unit of the credit card double authentication system according to the present invention.

As shown in FIG. 5, the ID authentication check/item checkout unit 3 of the system 1 comprises a computing unit 55, an interface control unit 56, an item checkout control unit 57, an ID authentication check control unit 58, a blacklist check unit 59, a credit reference control unit 60, a database control unit 61, a communication control unit 62, a notice control unit 63, a display 64, and a power unit 65.

The computing unit 55 of the ID authentication check/item checkout unit 3 is connected with the interface control unit 56, the item checkout control unit 57, the ID authentication check control unit 58, the blacklist check unit 59, the credit reference control unit 60, the database control unit 61, the communication control unit 62, the notice control unit 63, the display 64, and the power unit 65.

Figure 6:
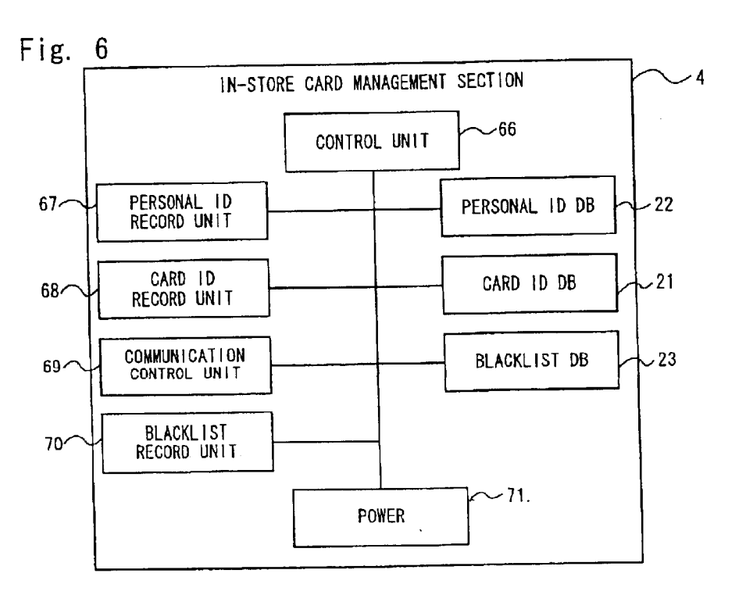
FIG. 6 shows the configuration of the in-store card management section according to the present credit card double authentication system.

FIG. 6 is a diagram showing the in-store card management section according to the present credit card double authentication system.

The in-store card management section 4 of the present authentication system 1 comprises, as shown in FIG. 6, a control unit 66, a personal ID register unit 67, a card ID register unit 68, a communication control unit 69, a blacklist register unit 70, a personal ID database 22, a card ID database 21, a blacklist database 23, and a power unit 71.

As shown in FIG. 6, the in-store card management section 4 is connected with the personal ID register unit 67, the card ID register unit 68, the communication control unit 69, the blacklist register unit 70, the personal ID database 22, the card ID database 21, the blacklist database 23, and the power unit 71.

Figure 7:
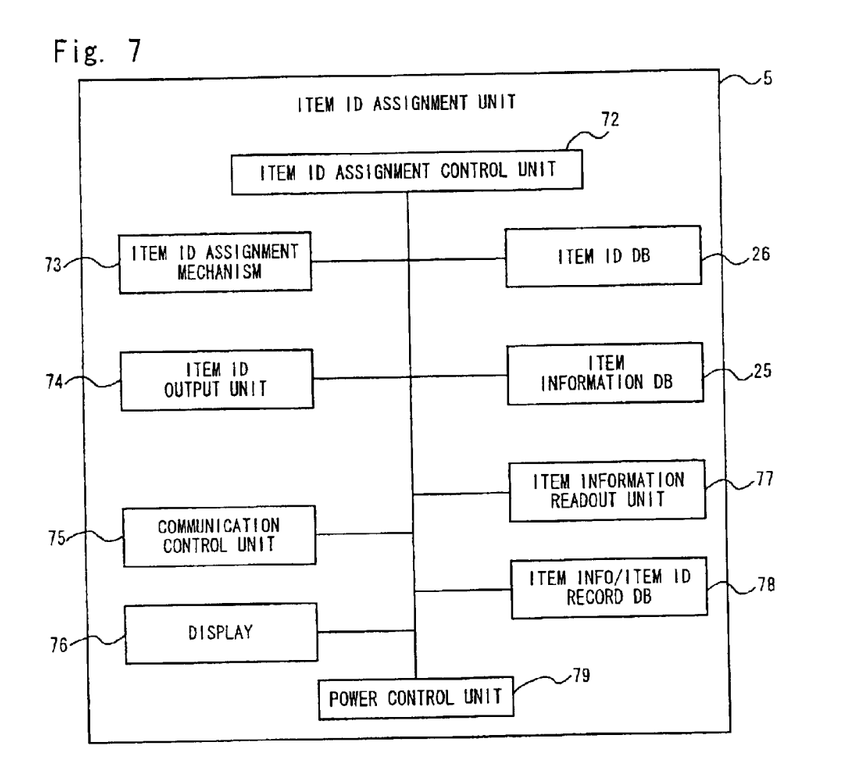
FIG. 7 shows the configuration of the item ID assignment unit according to the present credit card double authentication system.

FIG. 7 is a diagram showing the configuration of the item ID assignment unit of the present authentication system.

As shown in FIG. 7, the item ID assignment unit 5 of the present credit card double authentication system 1 comprises an item ID assignment control unit 72, an item ID assignment mechanism 73, an item ID output unit 74, a communication control unit 75, a display 76, an item ID database 26, an item information database 25, an item information readout unit 77, an item information/item ID registration database 78, and a power control unit 79.

In the item ID assignment unit 5, as shown in FIG. 7, the item ID assignment control unit 72 is connected with the item ID assignment mechanism 73, the item ID output unit 74, the communication control unit 75, the display 76, the item ID database 26, the item information database 25, the item information readout unit 77, the item information/item ID registration database 78, and the power control unit 79.

Figure 8:
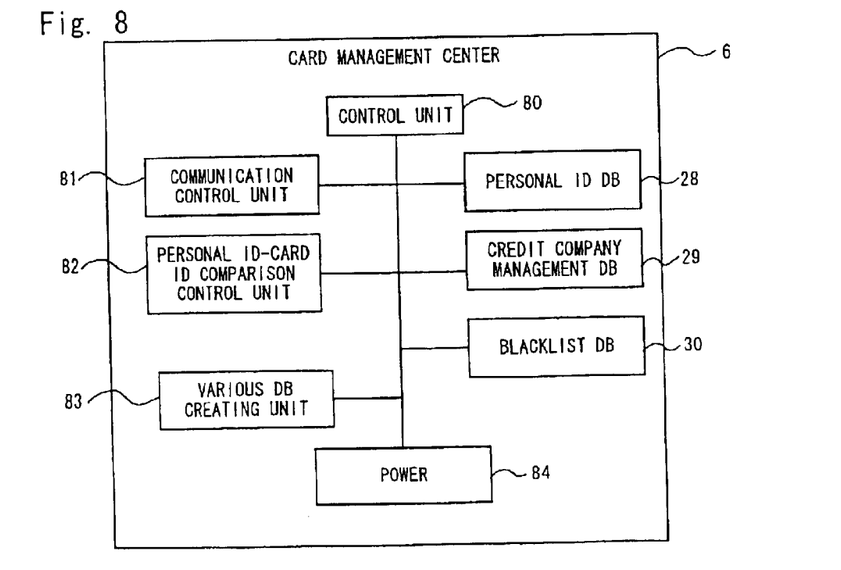
FIG. 8 shows the configuration of the card management center according to the present credit card double authentication system.

FIG. 8 is a diagram showing the configuration of the card management center according to the present credit card double authentication system.

The card management center 6 of the authentication system 1 comprises, as shown in FIG. 8, a control unit 80, a communication control unit 81, a comparison control unit 82 for comparing the personal ID 10 of the user P with the credit card ID 9 of each credit company 7, a various database creation unit 83, a personal ID database 28, a credit company management database 29 for each company, a blacklist database 30, and a power source 84.

According to the card management center 6, as shown in FIG. 8, the control unit 80 is connected with the communication control unit 81, the comparison control unit 82, the various database creation unit 83, the personal ID database 28, the credit company management database 29, the blacklist database 30, and the power source 84.

Figure 9:
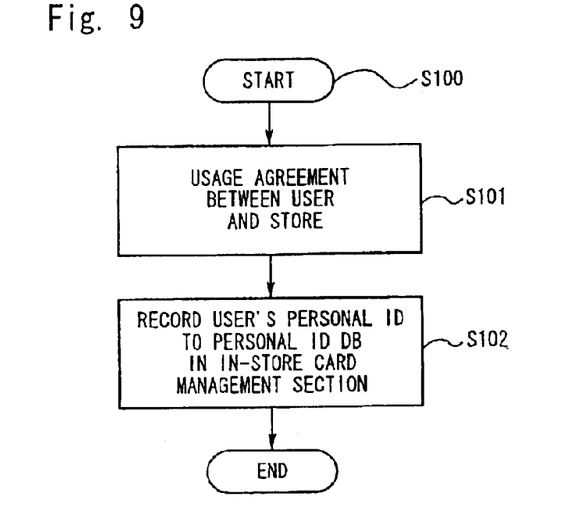
FIG. 9 is a flowchart showing the process of issuing a user's personal ID according to the present credit card double authentication system.

FIG. 9 is a flowchart showing the process for issuing the personal ID for a user according to the present credit card double authentication system.

Upon issuing a personal ID of a user P, the process that starts at step S100 proceeds to step S101 where a user agreement is made between the user P and the store, and the procedure advances to step S102 where the personal ID 10 of the user P is registered to the personal ID database 22 at the in-store card management section 4.

Figure 10:
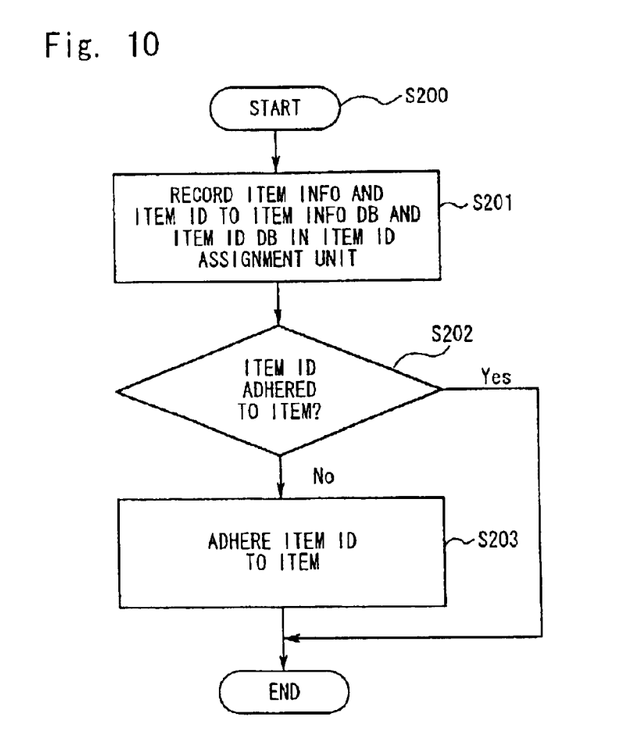
FIG. 10 is a flowchart showing the process of recording the item information and item ID according to the present credit card double authentication system.

FIG. 10 is a flowchart showing the process for registering the item information and item ID according to the present credit card double authentication system.

Upon registering the item information of item A and the item ID 12 of item A, the process that starts at step S200 advances to step S201 where the item information of item A and the item ID 12 assigned to item A are recorded in the item information database 25 and the item ID database 26 of the item ID assignment unit 5, respectively. Then, the procedure advances to step S202 where it is judged whether item ID 12 is already adhered to item A or not.

If it is determined at step S202 that item ID 12 is not adhered to item A, the procedure advances to step S203 where the item ID assignment unit 5 adheres the item ID 12 to item A.

Figure 11:
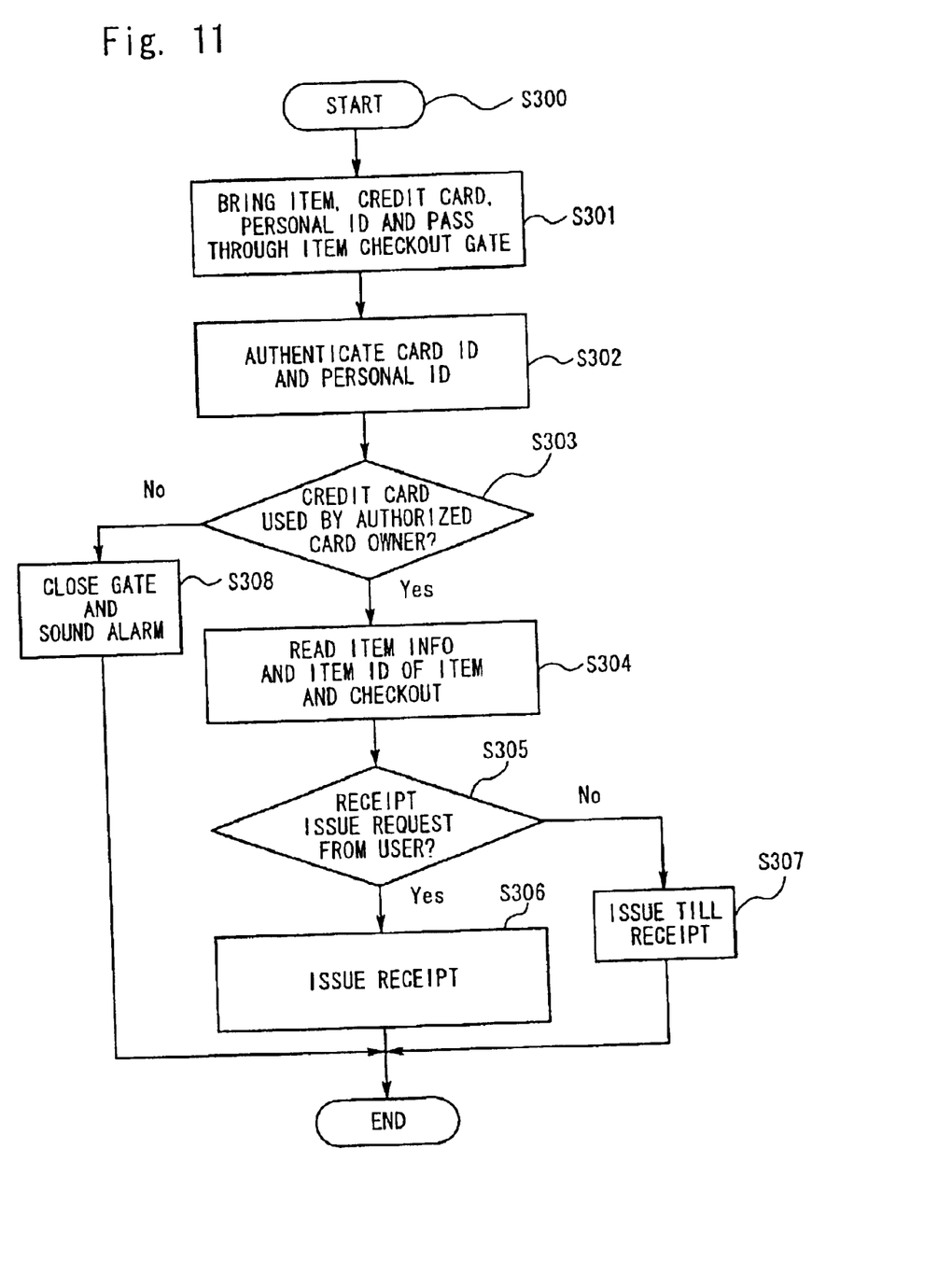
FIG. 11 is a flowchart showing the process for a user to purchase an item according to the present credit card double authentication system.

FIG. 11 is a flowchart showing the procedure for a user to purchase an item according to the present credit card double authentication system.

Upon purchase of item A by the user P, the process that starts at step S300 advances to step S301 where user P takes item A to be purchased, the credit card CC and the personal ID of the user P to the item checkout gate 2. When the user P together with item A, credit card and personal ID passes through the item checkout gate 2, the gate 2 reads the card ID 9 of the credit card that user P uses, the personal ID 10 of user P and the item ID 12 assigned to item A. Then, the procedure advances to step S302 where authentication of credit card ID 9 and personal ID 10 of user P are performed, in which the individual authenticating unit 11 performs individual authentication utilizing the personal ID of user P in addition to individual authentication utilizing the credit card ID 9. Then, in step S303, it is determined whether the credit card is used by the authorized person (card owner) or not.

If it is determined in step S303 that the credit card is used by the authorized person, the procedure advances to step S304 where the item checkout gate 2 reads the item information of item A to be purchased and the item ID 12 assigned thereto and performs checkout thereof. Thereafter in step S305, it is determined whether or not user P requests issuance of receipt, and if receipt issuance is requested in step S305, the procedure advances to step S306 where the receipt issue unit 15 issues a receipt.

If there is no receipt issuance request from user P in step S305, the procedure advances to step S307 where the receipt issue unit 15 issues a till receipt.

If it is determined that the credit card is not used by the authorized person in step S303, the procedure advances to step S308 where the gate 14 of the item checkout gate 2 closes and an alarm sounds.

Figure 12:
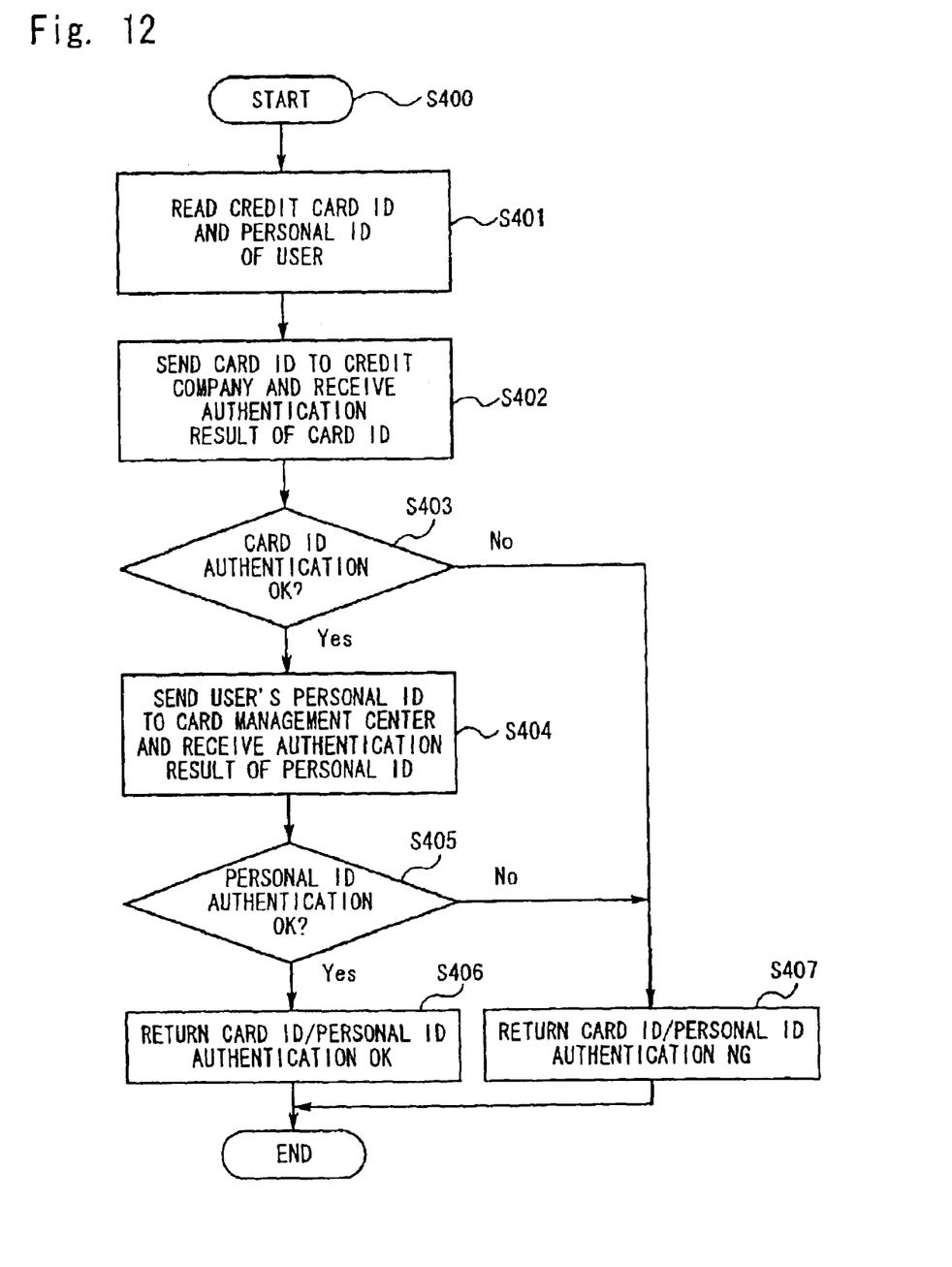
FIG. 12 is a flowchart showing the process for authenticating the credit card ID and the user's personal ID when an item is being purchased by a user according to the present credit card double authentication system.

FIG. 12 is a flowchart showing the process for authenticating the credit card ID and the user's personal ID at the time of purchase according to the present credit card double authentication system.

The process starting at S400 for authenticating the credit card ID 9 of the credit card CC being used by user P to purchase an item and the personal ID 10 of the user P reads in the card ID 9 of credit card CC and the personal ID 10 of user P at the item checkout gate 2 in step S401, and moves on to step S402. In step S402, the procedure sends the card ID of credit card CC read in at item checkout gate 2 via communication line 8 to credit card company 7, and in return, receives the authentication result of the credit card ID 9. Next, in step S403, whether the authentication of credit card ID 9 is approved (OK) or not is determined.

If the authentication of the credit card ID 9 is approved (OK) in step S403, the procedure advances to step S404, where the procedure sends the personal ID 10 of user P read in at item checkout gate 2 via communication line 8 to card management center 6, and in return, receives the authentication result of the personal ID 10 of user P. Next, in step S405, whether the authentication of personal ID 10 of user P is approved (OK) or not is determined.

If the authentication of personal ID 10 of user P is approved (OK) in step S405, the procedure advances to step S406 where the procedure returns approval (OK) of authentication of the card ID 9 of credit card CC and personal ID 10 of user P.

If the authentication of credit card ID 9 is not approved in step S403, the procedure advances to step S407 where the procedure returns authentication NG of the credit card ID 9 and the personal ID 10 of user P.

If the authentication of personal ID 10 of user P is not approved in step S405, the procedure advances to step S407 where the procedure returns authentication NG of the credit card ID 9 and the personal ID 10 of user P.

Figure 13:
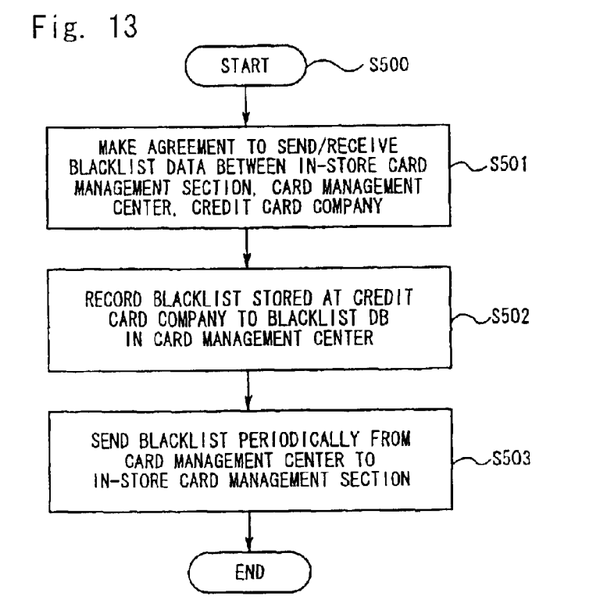
FIG. 13 is a flowchart showing the process for recording a blacklist to the card management center according to the present credit card double authentication system.

FIG. 13 is a flowchart showing the procedure for recording a blacklist to the card management center according to the present card double authentication system.

The procedure starts at step S500. Upon registering the blacklist data to the card management center 6, at step S501, the procedure makes an agreement between the in-store card management section 4, the card management center 6 and the credit card company 7 to share (transmit) blacklist data. Next, in step S502, the procedure records the blacklist possessed by the credit company 7 to the blacklist database 30 of the card management center 6. Thereafter, in step S503, the procedure periodically transmits the blacklist data from the card management center 6 via communication line 8 to the in-store card management section 4.

Figure 14:
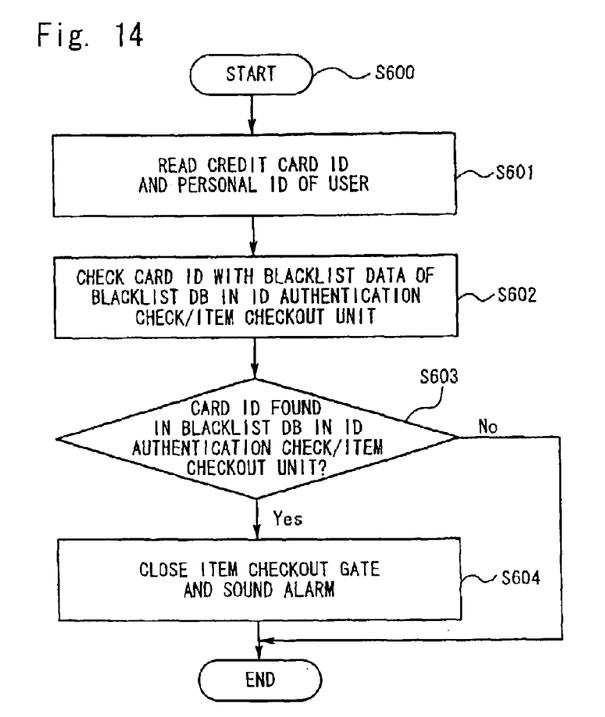
FIG. 14 is a flowchart showing the process for checking the credit card ID with a blacklist when an item is being purchased by a user according to the present credit card double authentication system.

FIG. 14 is a flowchart showing the procedure for checking the card ID of the credit card used by a user to purchase an item with a blacklist according to the present card double authentication system.

The procedure starts at step S600. Upon checking the card ID 9 of credit card CC used by user P to purchase an item with a blacklist, in step S601, the procedure reads the card ID 9 of credit card CC and the personal ID 10 of user P at the item checkout gate 2. Next, in step S602, the credit card ID read in at gate 2 is checked with the blacklist data in the blacklist database 19 of the ID authentication check/item checkout unit 3. Thereafter, in step S603, the procedure determines whether or not the credit card ID 9 is included in the blacklist data stored in the blacklist database 19 of the ID authentication check/item checkout unit 3.

If according to step S603 the card ID 9 of the credit card CC is included in the blacklist data stored in the ID authentication check/item checkout unit 3, the procedure advances to step S604 where the gate 14 of the item checkout gate 2 is shut and an alarm is sounded.

As explained, the credit card double authentication system of the present invention provides a service that alternately carries out the management business of a personal ID of the credit card user and the card ID of the credit card, and thereby enables to perform management of the personal ID of the user and the card ID of the credit card at low cost. The present system comprises an individual authentication unit that performs at the time of purchase of an item by a user authentication of the card user utilizing a personal ID of the user in addition to the authentication of a card user using the card ID of the credit card used by the user. Thus, the present system authenticates the credit card twice, securely preventing the unauthorized use of the credit card. According further to the present system, the items can be checked out quicker at the item checkout gate, and the item checkout gate can be unmanned, enabling efficient cut-down of personnel costs that lead to reduced prices of items. According to the present system, the credit card user is not required to follow bothersome procedure even when he/she loses his/her credit card, so the user can use the credit card without feeling anxious.

According to the present credit card double authentication system, a card ID of a credit card that a user uses and a personal ID of said user can be recorded to the customer database in the in-store card management section and in the card management center when a user uses (shops etc. at) a store.

According to the present credit card double authentication system, the item ID assignment unit can assign an item ID to an item, and the store can record the item information and the item ID of the item to a database of the item ID assignment unit.

According further to the present system, the item checkout gate can read in the card ID of the credit card used by the user, the personal ID of said user and the item ID assigned to the item at the time of purchase of the item, and can send the information to the ID authentication check/item checkout unit.

According to the present system, the ID authentication check/item checkout unit can authenticate the use of the credit card upon receiving the card ID of the credit card and the personal ID of the user.

According further to the present system, the ID authentication check/item checkout unit can read in the item information corresponding to the received item ID from a database and check out the item after authenticating the use of the credit card.

According to the present system, the gate can be closed and an alarm can be sounded out if the credit card is not used by its owner.

According to the present system, a receipt can be issued if a receipt issue request from a user exists, and a till receipt can be issued if there is no receipt issue request from the user.

According further to the present system, an agreement to mutually send and receive a blacklist data can be made between the in-store card management section, the card management center and the credit card company, the card management center receiving the blacklist data through the communication line from the credit card company, and the card management center sending the blacklist data through the communication line to the in-store card management section and if necessary to the ID authentication check/item checkout unit.

According to the present system, the card ID of the credit card read at the gate can be checked with the blacklist data at the ID authentication check/item checkout unit at the time of purchase of an item by a user.

According to the present system, a notice reporting unauthorized credit card use can be output if the card ID of the credit card read at the item checkout gate is found in the blacklist data stored at the ID authentication check/item checkout unit or at the in-store card management section.

According further to the present system, the item checkout gate can read in the card ID of the credit card and the personal ID of the user at the time of purchase of an item by the user, send the card ID of the credit card through the communication circuit to the credit card company, and receive the authentication result of the card ID of the credit card.

What is claimed is:

1. A credit card double authentication system comprising:
   an item checkout gate, an ID authentication check/item checkout unit, a personal computer in an in-store card management section, an item ID assignment unit, a card management center and a credit card company, which are connected via a communication line so as to send and receive item information;
   an individual authenticating unit having an identity authenticating function for performing identity authentication based both on a card ID of a credit card used by a user upon purchasing an item, and in addition thereto, performing identity authentication based on a personal ID of said user; and said in-store card management section, said card management center and said credit card company makes an agreement to mutually send and receive a blacklist data intended to prevent unauthorized use of credit card, said card management center receiving the blacklist data through the communication line from the credit card company, and said card management center sending the blacklist data through the communication line to the in-store card management section and if necessary to the ID authentication check/item checkout unit.

2. A credit card double authentication system according to claim 1, said system further comprising:

a function to record a card ID of a credit card that the user uses and a personal ID of said user to the customer database in the in-store card management section and in the card management center when the user uses the store.

3. A credit card double authentication system according to claim 1, wherein said item ID assignment unit comprises a function to assign an item ID to an item, and the store further comprises a function to register the item information and the item ID of the item to a database in the item ID assignment unit.

4. A credit card double authentication system according to claim 1, wherein said item checkout gate is equipped with a function to read the card ID of the credit card used by the user, the personal ID of said user and the item ID assigned to the item at the time of purchase of the item, and to send the information to the ID authentication check/item checkout unit.

5. A credit card double authentication system according to claim 1, wherein said item checkout gate is equipped with a function to read the card ID of the credit card used by the user, the personal ID of said user and the item ID assigned to the item at the time of purchase of the item, and to send the information to the ID authentication check/item checkout unit; and said ID authentication check/item checkout unit is equipped with a function to authenticate the use of the credit card upon receiving the card ID of the credit card and the personal ID of the user.

6. A credit card double authentication system according to claim 1, wherein said ID authentication check/item checkout unit is equipped with a function to read in the item information corresponding to the received item ID from a database and checking out the item after authenticating the use of the credit card.

7. A credit card double authentication system according to claim 1, wherein said item checkout gate is equipped with a gate that can be opened and closed, and is further equipped with a function to close the gate and sound out an alarm when according to the authentication process it is determined that the credit card is not used by the credit card's owner.

8. A credit card double authentication system according to claim 1, wherein said item checkout gate is equipped with a function to issue a receipt when a receipt issue request from a user exists, and a function to issue a till receipt when there is no receipt issue request from the user.

9. A credit card double authentication system according to claim 1, wherein said item checkout gate is equipped with a function to check the card ID of the credit card read at the gate with the blacklist data in the ID authentication check/item checkout unit at the time of purchase of an item by a user.

10. A credit card double authentication system according to claim 1, wherein said item checkout gate is equipped with a function to check the card ID of the credit card read at the gate with the blacklist data in the ID authentication check/item checkout unit at the time of purchase of an item by a user; and said item checkout gate is further equipped with a function to output a notice reporting unauthorized credit card use if the card ID of the credit card read at the item checkout gate is found in the blacklist data stored at the ID authentication check/item checkout unit or at the in-store card management section.

11. A credit card double authentication system according to claim 1, wherein said item checkout gate is equipped with a function to read the card ID of the credit card and the personal ID of the user at the time of purchase of an item by the user, to send the card ID of the credit card through the communication line to the credit card company, and to receive the authentication result of the card ID of the credit card.

* * * * *